United States Patent
Jeong (10) Patent No.: US 9,645,016 B2
(45) Date of Patent: May 9, 2017

(54) TEMPERATURE SENSOR (71) Applicant: SK hynix Inc., Icheon-si, Gyeonggi-do (KR)

(72) Inventor: Hyun Sik Jeong, Seoul (KR)

(73) Assignee: SK hynix Inc., Icheon-si (KR)

( * ) Notice: Subject to any disclaimer, the term of this patent is extended or adjusted under 35 U.S.C. 154(b) by 561 days.

(21) Appl. No.: 14/306,378

(22) Filed: Jun. 17, 2014

(65) Prior Publication Data

US 2014/0294047 A1 Oct. 2, 2014

Related U.S. Application Data (62) Division of application No. 12/975,228, filed on Dec. 21, 2010.

(30) Foreign Application Priority Data

Feb. 25, 2010 (KR) ........................ 10-2010-0017327

(51) Int. Cl.
*G01K 7/21* (2006.01)
*G01K 7/22* (2006.01)

(52) U.S. Cl.
CPC ........... *G01K 7/22* (2013.01); *G01K 7/21* (2013.01)

(58) Field of Classification Search
USPC ................. 374/170, 178, 183, 163; 327/512
See application file for complete search history.

(56) References Cited

U.S. PATENT DOCUMENTS

| | | | | |
|---|---|---|---|---|
| 4,448,549 A * | 5/1984 | Hashimoto | ............... | G01K 7/01 331/143 |
| 5,085,526 A * | 2/1992 | Sawtell | ................... | G05F 1/648 327/512 |
| 6,683,490 B2 * | 1/2004 | Kaminishi | .............. | H01S 5/042 327/513 |
| 7,414,455 B2 * | 8/2008 | Nam | ...................... | G01K 3/005 327/512 |
| 7,427,158 B2 * | 9/2008 | Yoshida | .................. | G01K 7/01 327/513 |
| 7,451,053 B2 * | 11/2008 | Jeong | ...................... | G11O 5/147 324/750.03 |
| 7,528,644 B2 * | 5/2009 | Choi | ...................... | G01K 7/015 327/512 |
| 7,643,889 B2 * | 1/2010 | Jeong | ...................... | G01K 7/01 324/224 |
| 7,741,925 B2 * | 6/2010 | Yoshikawa | .............. | G01K 7/01 327/512 |
| 7,777,554 B2 * | 8/2010 | Hirano | .................. | G01K 1/026 327/512 |
| 2007/0110123 A1 * | 5/2007 | Nam | ...................... | G01K 3/005 374/170 |

(Continued)

FOREIGN PATENT DOCUMENTS

| | | | |
|---|---|---|---|
| KR | 100123827 B1 * | 9/1997 | |
| KR | 100854463 B1 * | 8/2008 | |

(Continued)

*Primary Examiner* — Mirellys Jagan
(74) *Attorney, Agent, or Firm* — William Park & Associates Ltd.

(57) ABSTRACT

A temperature sensor generates a variable voltage whose level decreases linearly as a temperature increases, and compares the variable voltage with first and second reference voltages to generate first and second temperature codes to measure the temperature.

13 Claims, 5 Drawing Sheets (56) References Cited

U.S. PATENT DOCUMENTS

| | | | |
|---|---|---|---|
| 2008/0043810 A1* | 2/2008 | Vogt | G01K 1/02 374/170 |
| 2008/0061863 A1* | 3/2008 | De Barros Soldera | G01K 7/015 327/512 |
| 2009/0072882 A1* | 3/2009 | Jeong | G11O 5/147 327/513 |
| 2009/0141770 A1* | 6/2009 | Chen | G01K 7/00 374/170 |
| 2010/0098133 A1* | 4/2010 | Shin | G01K 7/015 374/170 |
| 2010/0124251 A1* | 5/2010 | Peterson | G01K 7/01 374/171 |
| 2011/0158286 A1* | 6/2011 | Peterson | G01K 7/01 374/170 |
| 2012/0201273 A1* | 8/2012 | Mukherjee | G01K 1/026 374/183 |
| 2012/0257648 A1* | 10/2012 | Jeong | G01K 7/00 374/163 |

FOREIGN PATENT DOCUMENTS

| | | | |
|---|---|---|---|
| KR | 100904738 B1 * | 6/2009 | |
| KR | 1020100006398 A * | 1/2010 | |

* cited by examiner

TEMPERATURE SENSOR

CROSS-REFERENCES TO RELATED APPLICATIONS

The present application claims priority under 35 U.S.C 119(a) to Korean application number 10-2010-0017327, filed on Feb. 25, 2010, in the Korean intellectual property Office, which is incorporated herein by reference in its entirety set forth in full.

BACKGROUND

To meet the demands of the high performance of electronic systems such as personal computers or electronic communication devices, nonvolatile semiconductor memory devices such as DRAMs mounted as memory devices have been designed to operate at higher speed and have become highly integrated. Since semiconductor memory devices mounted on battery-driven systems such as mobile phones or notebook computers desperately require a low power consumption characteristic, many efforts and developments have been made to reduce an operating current and a standby current.

A data retention characteristic of a DRAM cell consisting of one transistor and one storage capacitor is very sensitive to temperature. Therefore, it may be necessary to adjust the operating conditions of circuit blocks inside semiconductor integrated circuits, depending on the variation in an ambient temperature. For example, DRAMs used in mobile products adjust a refresh period, depending on the variation in an ambient temperature. Temperature sensors, such as a Digital Temperature Sensor Regulator (DTSR), an Analog Temp Sensor Regulator (ATSR), and a Digital Temperature Compensated Self Refresh (DTCSR), are used to adjust the operating conditions depending on the variation in the ambient temperature.

A DTCSR is a temperature sensor which is used to sense an ambient temperature and determine a refresh period of memory cells. A typical DTCSR senses an ambient temperature to generate a variable voltage, and compares the level of the variable voltage with the level of a reference voltage to generate a code signal. In the DTCSR, the variable voltage is generated from a circuit which is implemented with an NMOS transistor, a PMOS transistor, a resistor, and so on. Therefore, the variable voltage changes nonlinearly with the temperature variation, and it is difficult to predict the voltage variation which is caused by the process variation. Furthermore, it is difficult to measure the temperature exactly because the voltage variation has a gentle slope with respect to the temperature voltage.

SUMMARY

An embodiment of the present invention relates to a temperature sensor which is capable of measuring a temperature exactly to thereby maintain a normal operation of a semiconductor memory device.

In one embodiment, a temperature sensor includes: a reference voltage generation unit configured to divide a driving voltage and generate a reference voltage; a first resistor coupled between a driving voltage terminal and a first node through which a nonlinear voltage is outputted; a first switch coupled between the first node and a ground voltage terminal, and configured to be turned on in response to the reference voltage; a second resistor coupled between the driving voltage terminal and a second node through which a variable voltage is outputted; a second switch coupled between the second node and a third node, and configured to be turned on in response to the nonlinear voltage; a third resistor coupled between the third node and the ground voltage terminal; and a temperature code generation unit configured to compare the level of the reference voltage with the level of the variable voltage, and generate a temperature code.

In another embodiment, a temperature sensor includes: a reference voltage generation unit configured to divide a driving voltage and generate a reference voltage; a variable voltage generation unit configured to generate a nonlinear voltage in response to the reference voltage and a bias resistor, whose resistance is set in response to a test mode signal or a fuse cutting, and generates a variable voltage from the nonlinear voltage; and a temperature code generation unit configured to compare the level of the reference voltage with the level of the variable voltage, and generate a temperature code.

In another embodiment, a temperature sensor includes: a reference voltage generation unit configured to divide a driving voltage and generate first and second reference voltages; a variable voltage generation unit configured to generate a variable voltage in response to the first reference voltage and a bias resistor; a first temperature code generation unit configured to compare the level of the first reference voltage with the level of the variable voltage, and generate a first temperature code; and a second temperature code generation unit configured to compare the level of the second reference voltage with the level of the variable voltage, and generate a second temperature code.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 1:
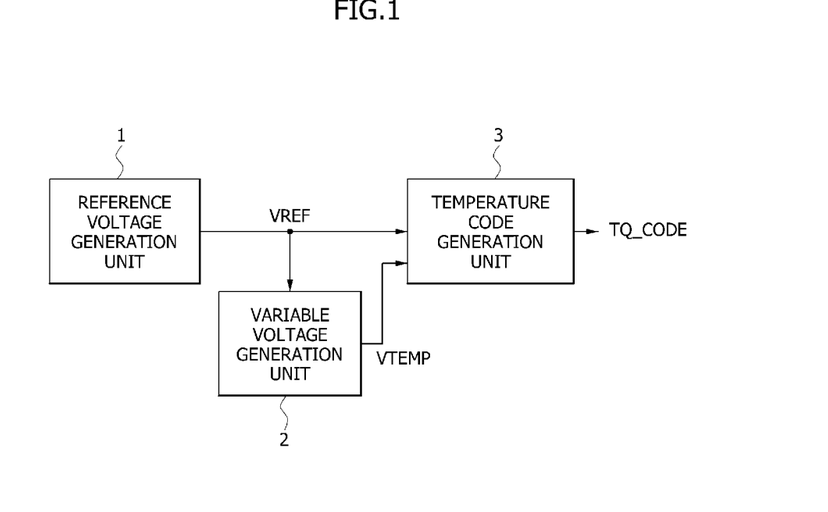
FIG. 1 is a block diagram illustrating the configuration of a temperature sensor according to an embodiment of the present invention.

FIG. 1 is a block diagram illustrating the configuration of a temperature sensor according to an embodiment of the present invention.

Referring to FIG. 1, the temperature sensor includes a reference voltage generation unit 1, a variable voltage generation unit 2, and a temperature code generation unit 3. The reference voltage generation unit 1 is operatively coupled to the variable voltage generation unit 2, and to the temperature code generation unit 3. The variable voltage generation unit 2 is operatively coupled to the temperature code generation unit 3. The terminology "operatively coupled" as used herein refers to coupling that enables operational and/or functional communication and relationships there-between and may include any intervening items necessary to enable such communication such as, for example, data communication buses or any other necessary intervening items that one of ordinary skill would understand to be present. Also, it is to be understood that other intervening items may be present between "operatively coupled" items even though such other intervening items are not necessary to the functional communication facilitated by the operative coupling. For example, a data communication bus may provide data to several items along a pathway along which two or more items are operatively coupled, etc. Such operative coupling is shown generally in the figures described herein.

Figure 2:
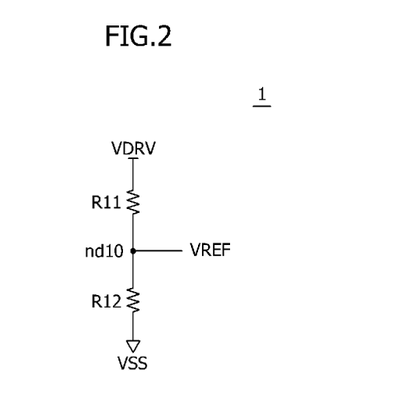
FIG. 2 is a circuit diagram illustrating the configuration of a reference voltage generation unit included in the temperature sensor of FIG. 1.

FIG. 2 illustrates an embodiment in which the reference voltage generation unit 1 includes resistors R11 and R12 coupled between a driving voltage (VDRV) terminal and a ground voltage (VSS) terminal, and configured to divide a driving voltage VDRV and generate a reference voltage VREF whose level corresponds to a specific temperature.

Figure 3:
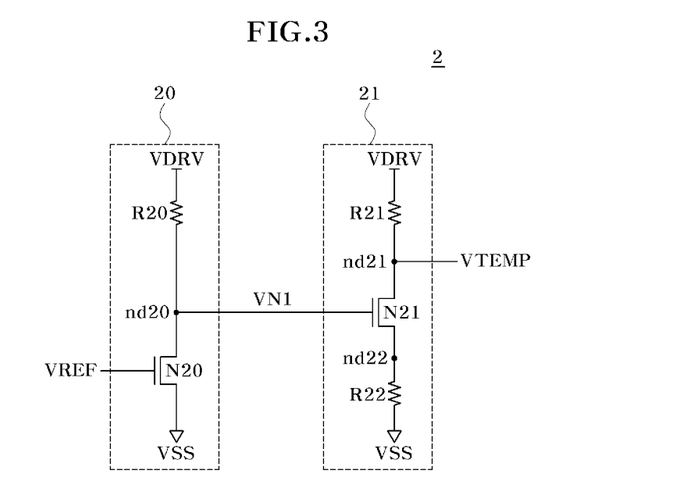
FIG. 3 is a circuit diagram illustrating the configuration of a variable voltage generation unit included in the temperature sensor of FIG. 1 according to an embodiment of the present invention.

As illustrated in FIG. 3, the variable voltage generation unit 2 according to an embodiment of the present invention includes a first nonlinear voltage generation section 20 and a first linear voltage generation section 21. The first nonlinear voltage generation section 20 is operatively coupled to the first linear voltage generation section 21 and includes a resistor R20 and an NMOS transistor N20. Specifically, the resistor R20 is coupled between the driving voltage (VDRV) terminal and a node nd20, through which a first nonlinear voltage VN1 is outputted. The NMOS transistor N20 is coupled between the node nd20 and the ground voltage (VSS) terminal, and configured to operate as a switch which is turned on in response to the reference voltage VREF. The NMOS transistor N20 is designed so that a smaller amount of turn-on current flows as the temperature increases. The first linear voltage generation section 21 includes a resistor R21, an NMOS transistor N21, and a resistor R22. Specifically, the resistor R21 is coupled between the driving voltage (VDRV) terminal and a node nd21, through which a variable voltage VTEMP is outputted. The NMOS transistor N21 is coupled between the node nd21 and a node nd22, and configured to operate as a switch which is turned on in response to the first nonlinear voltage VN1. The resistor R22 is coupled between the node nd22 and the ground voltage (VSS) terminal. The NMOS transistor N21 is designed so that a larger amount of turn-on current flows as the temperature increases.

The operation of the variable voltage generation unit 2 of FIG. 3 will be described below with reference to FIG. 4.

Figure 4:
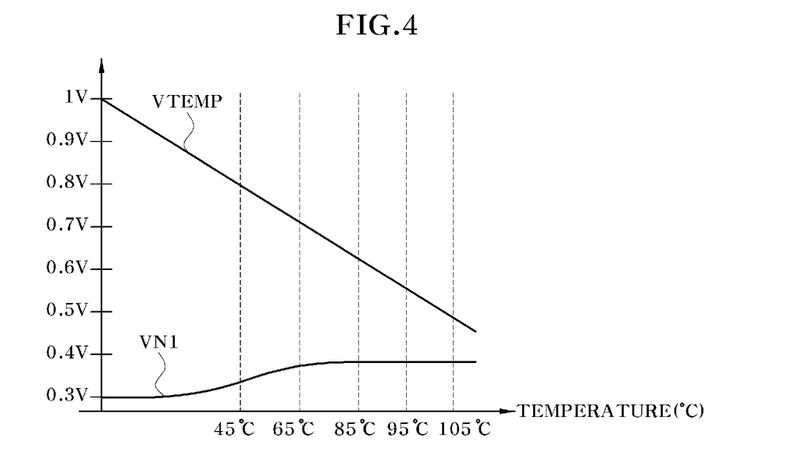
FIG. 4 is a graph explaining the operation of the variable voltage generation unit of FIG. 3.

As illustrated in FIG. 4, the first nonlinear voltage generation section 20 receives the reference voltage VREF and generates the first nonlinear voltage VN1 the level of which increases nonlinearly as the temperature increases. The reason why the first nonlinear voltage VN1 generated from the first nonlinear voltage generation section 20 has the nonlinear characteristic is that a level rise slope according to the temperature increase of the first nonlinear voltage VN1 is reduced by the NMOS transistor N20 designed so that a smaller amount of the turn-on current flows as the temperature increases.

Thereafter, the first linear voltage generation section 21 receives the first nonlinear voltage VN1 and generates the variable voltage VTEMP. As described above, the temperature characteristic of the NMOS transistor N21 included in the first linear voltage generation section 21 is opposite to that of the NMOS transistor N20. Also, as the temperature increases, the level of the variable voltage VTEMP is linearly decreased by the nonlinear characteristic of the first nonlinear voltage VN1.

Figure 5:
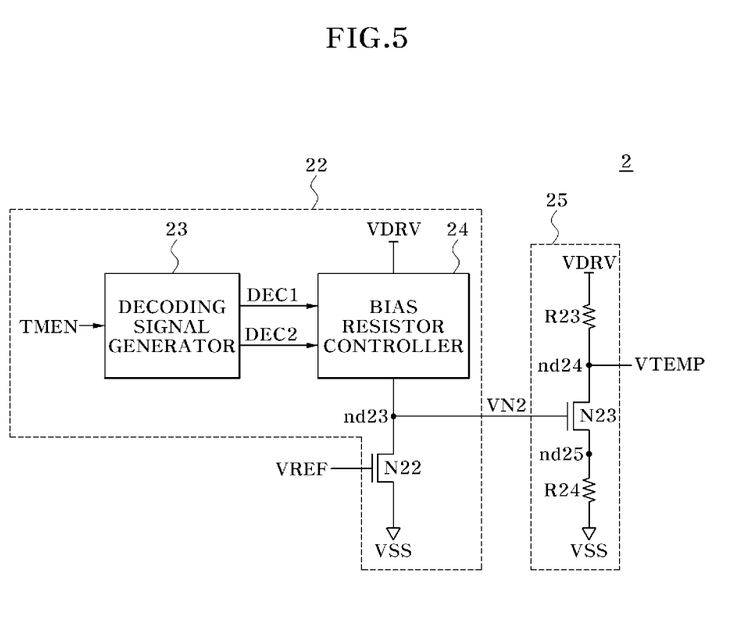
FIG. 5 is a configuration diagram of a variable voltage generation unit included in the temperature sensor of FIG. 1 according to another embodiment of the present invention.

As illustrated in FIG. 5, a variable voltage generation unit 2 according to another embodiment includes a second nonlinear voltage generation section 22 and a second linear voltage generation section 25.

The second nonlinear voltage generation section 22 includes a decoding signal generator 23, a bias resistor controller 24, which is operatively coupled to the decoding signal generator 23, and an NMOS transistor N22 which is operatively coupled to the bias resistor controller 24. The NMOS transistor N22 is coupled between a node nd23 and a ground voltage (VSS) terminal, and configured to operate as a switch which is turned on in response to a reference voltage VREF. The NMOS transistor N22 is designed so that a smaller amount of turn-on current flows as the temperature increases.

Figure 6:
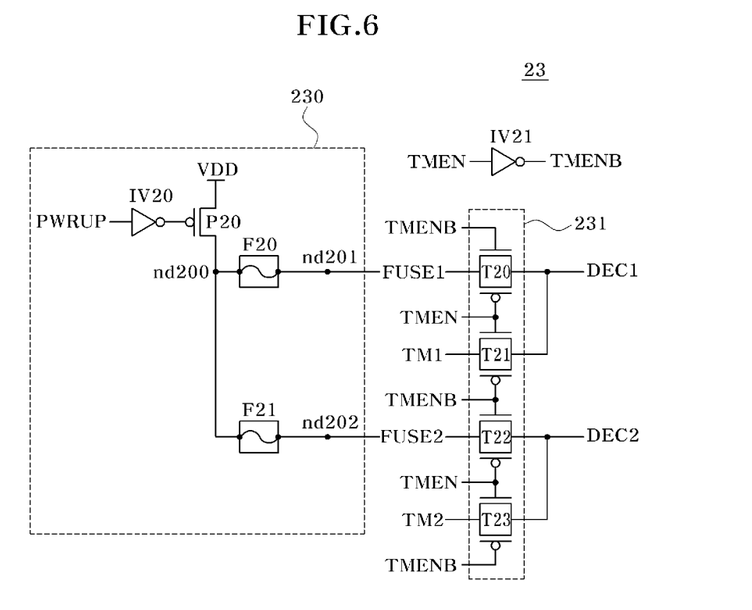
FIG. 6 is a circuit diagram illustrating the configuration of a decoding signal generator included in the variable voltage generation unit of FIG. 5.

As illustrated in FIG. 6, the decoding signal generator 23 includes a fuse signal generation circuit 230 and a selective output circuit 231.

The fuse signal generator 230 is operatively coupled to the selective output circuit 231, and includes a PMOS transistor P20, a first fuse F20, and a second fuse F21. The PMOS transistor P20 is coupled between a power supply voltage (VDD) terminal and a node nd200, and configured to receive an inversion signal of a power-up signal PWRUP, at the P20 gate terminal, through an inverter IV20 and thereby pull up the node nd200. The first fuse F20 is coupled between the node nd200 and a node nd201, and the second fuse F21 is coupled between the node nd200 and a node nd202. The fuse signal generator 230 configured as above is supplied with a power supply voltage VDD in response to the power-up signal PWRUP, which changes to a high level after the completion of a power-up duration, and generates a first fuse signal FUSE1 and a second fuse signal FUSE2. "High level" and "low level" refers to, for example, voltage levels and/or voltage ranges that are predetermined to represent the high level or low level and not necessarily any specific values. It is to be understood that "high level" and "low level" may also be referred to as "logic levels" for example, a "high logic level" and a "low logic level," respectively. Such "logic levels" may also be understood to correspond to logical or binary bit values, for example, where a "low logic level" corresponds to a logical "0" and a "high logic level" corresponds to a logical "1" or vice versa depending on specific implementations in the various embodiments. The levels of the first fuse signal FUSE1 and the second fuse signal FUSE2 are determined according to whether the first fuse F20 and the second fuse F21 are cut or not. That is, when the first fuse F20 is not cut, the first fuse signal FUSE1 having a high level is generated. When the first fuse F20 is cut, the first fuse signal FUSE1 having a low level is generated. Also, when the second fuse F21 is not cut, the second fuse signal FUSE2 having a high level is generated. When the second fuse F21 is cut, the second fuse signal FUSE2 having a low level is generated.

The selective output circuit 231 includes a first transfer gate T20, a second transfer gate T21, a third transfer gate T22, and a fourth transfer gate T23. The first transfer gate T20 is configured to transfer the first fuse signal FUSE1 as a first decoding signal DEC1 in response to a test enable signal TMEN and an inverted test enable signal TMENB. The second transfer gate T21 is configured to transfer a first test mode signal TM1 as the first decoding signal DEC1 in response to the test enable signal TMEN and the inverted test enable signal TMENB. The third transfer gate T22 is configured to transfer the second fuse signal FUSE2 as a second decoding signal DEC2 in response to the test enable signal TMEN and the inverted test enable signal TMENB. The fourth transfer gate T23 is configured to transfer a second test mode signal TM2 as the second decoding signal DEC2 in response to the test enable signal TMEN and the inverted test enable signal TMENB. When the test enable signal TMEN is at a high level, the selective output circuit 231 configured as above transfers the first test mode signal TM1 as the first decoding signal DEC1, and transfers the second test mode signal TM2 as the second decoding signal DEC2. Also, when the test enable signal TMEN is at a low level, the selective output circuit 231 transfers the first fuse signal FUSE1 as the first decoding signal DEC1, and transfers the second fuse signal FUSE2 as the second decoding signal DEC2. The first test mode signal TM1 and the second test mode signal TM2 may be generated internally or applied from the outside.

Figure 7:
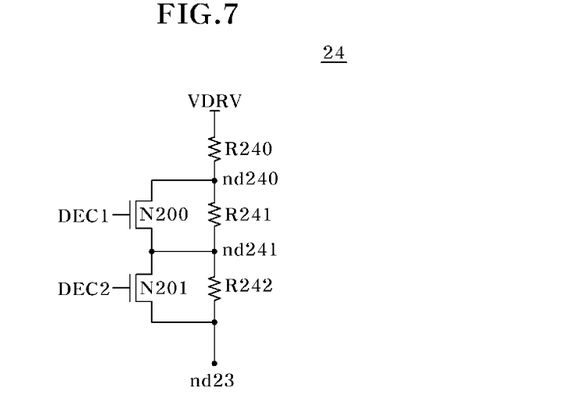
FIG. 7 is a circuit diagram illustrating the configuration of a bias resistor controller included in the variable voltage generation unit of FIG. 5.

As illustrated in FIG. 7, the bias resistor controller 24 may include a resistor R240, a resistor R241, an NMOS transistor N200, a resistor R242, and an NMOS transistor N201. The resistor R240 is coupled between the driving voltage (VDRV) terminal and a node nd240, and the resistor R241 is coupled between the node nd240 and a node nd241. The NMOS transistor N200 is coupled in parallel to the resistor R241 between the node nd240 and the node nd241, and configured to be turned on in response to the first decoding signal DEC1 received at the N200 gate terminal. The resistor R242 is coupled between the node nd241 and the node nd23. The NMOS transistor N201 is coupled in parallel to the resistor R242 between the node nd241 and the node nd23. The NMOS transistor N201 is configured to be turned on in response to the second decoding signal DEC2 received at the N201 gate terminal.

The second linear voltage generation section 25, which is operatively coupled to the second nonlinear voltage generation section 22, may include a resistor R23, an NMOS transistor N23, and a resistor R24. The resistor R23 is coupled between the driving voltage (VDRV) terminal and a node nd24, through which the variable voltage VTEMP is outputted. The NMOS transistor N23 is coupled between the node nd24 and a node nd25, and configured to operate as a switch which is turned on in response to the second nonlinear voltage VN2 at the N23 gate terminal. The resistor R24 is coupled between the node nd25 and the ground voltage (VSS) terminal. The NMOS transistor N23 is designed so that a larger amount of turn-on current flows as the temperature increases.

As described above, the variable voltage generation unit 2 of FIG. 5 can adjust the bias resistance between the driving voltage (VDRV) terminal and the node nd23 according to the first and second test mode signals TM1 and TM2 or according to whether the first fuse F20 and the second fuse F21 are cut or not.

The temperature code generation unit 3 may be implemented with a differential amplifier circuit which compares the level of the reference voltage VREF with the level of the variable voltage VTEMP and generates a temperature code TQ_CODE. The temperature code TQ_CODE is enabled when the level of the variable temperature VTEMP is lower than the level of the reference voltage VREF, and disabled when the level of the variable voltage VTEMP is higher than the level of the reference voltage VREF. The level of the variable voltage VTEMP decreases linearly as the temperature increases. In other words, the temperature code generation unit 3 generates the temperature code TQ_CODE when the variable voltage VTEMP is lower than the reference voltage VREF. Therefore, the case in which the variable voltage VTEMP is generated to be lower than the reference voltage VREF means that the temperature is higher than a specific temperature corresponding to the level of the reference voltage VREF.

In summary, in the temperature sensor according to an embodiment of the present invention, the variable voltage generation unit 2 implemented with the resistors and the NMOS transistors generates the variable voltage VTEMP whose level decreases linearly as the temperature increases, and the level of the variable voltage VTEMP is compared with the level of the reference voltage VREF to generate the temperature code TQ_CODE. The level of the variable voltage VTEMP generated from the temperature sensor according to the embodiment of the present invention decreases linearly as the temperature increases, and it is easy to predict the voltage variation according to the process variation. Furthermore, the temperature can be exactly measured.

Figure 8:
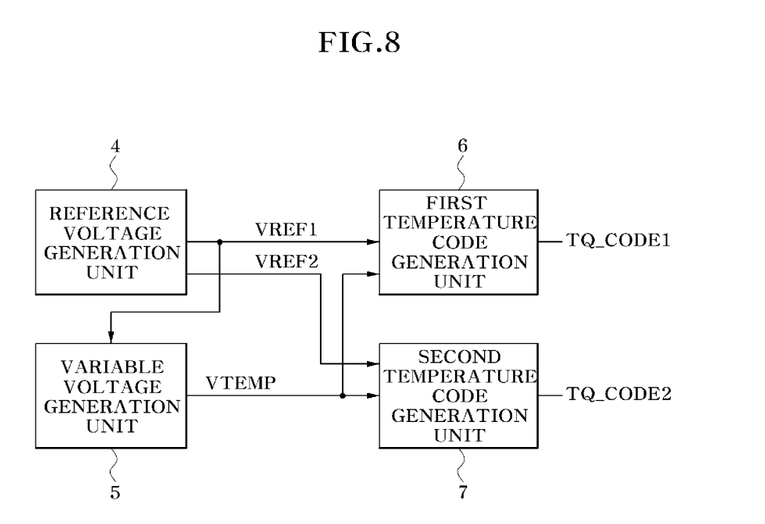
FIG. 8 is a block diagram illustrating the configuration of a temperature sensor according to another embodiment of the present invention.

FIG. 8 is a block diagram illustrating the configuration of a temperature sensor according to another embodiment of the present invention.

Referring to FIG. 8, the temperature sensor according to another embodiment of the present invention includes a reference voltage generation unit 4, a variable voltage generation unit 5, a first temperature code generation unit 6, and a second temperature code generation unit 7. The reference voltage generation unit 4 is operatively coupled to the first temperature code generation unit 6, the variable voltage generation unit 5 and the second temperature code generation unit 7. The variable voltage generation unit 5 outputs VTEMP, and is operatively coupled to both the first temperature code generation unit 6 and the second temperature code generation unit 7.

Figure 9:
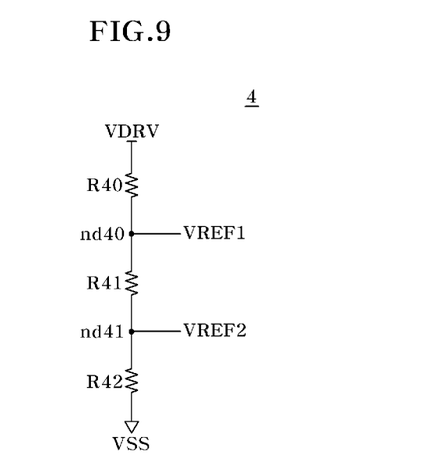
FIG. 9 is a block diagram illustrating the configuration of a reference voltage generation unit included in the temperature sensor of FIG. 8.

As illustrated in FIG. 9, the reference voltage generation unit 4 may include resistors R40, R41 and R42 coupled between a driving voltage (VDRV) terminal and a ground voltage (VSS) terminal, and configured to divide a driving voltage VDRV to generate a first reference voltage VREF1 and a second reference voltage VREF2. The first reference voltage VREF1 and the second reference voltage VREF2 have levels corresponding to a specific temperature.

The variable voltage generation unit 5 is configured to receive the first reference voltage VREF1 to generate a variable voltage VTEMP whose level decreases linearly as the temperature increases. The variable voltage generation unit 5 can be implemented with the circuits which have been described above with reference to FIGS. 3 to 8.

The first temperature code generation unit 6 may be implemented with a differential amplifier circuit which compares the level of the first reference voltage VREF1 with the level of the variable voltage VTEMP and generates a first temperature code TQ_CODE1. The first temperature code TQ_CODE1 is enabled when the level of the variable voltage VTEMP is lower than the level of the first reference voltage VREF1, and disabled when the level of the variable voltage VTEMP is higher than the level of the first reference voltage VREF1.

The second temperature code generation unit 7 may be implemented with a differential amplifier circuit which compares the level of the second reference voltage VREF2 with the level of the variable voltage VTEMP and generates a second temperature code TQ_CODE2. The second temperature code TQ_CODE2 is enabled when the level of the variable voltage VTEMP is lower than the level of the second reference voltage VREF2, and disabled when the level of the variable voltage VTEMP is higher than the level of the second reference voltage VREF2.

In summary, the temperature sensor according to the embodiment of the present invention generates the variable voltage VTEMP whose level decreases linearly as the temperature increases, and compares the level of the variable voltage VTEMP with the levels of the first and second reference voltages VREF1 and VREF2 to generate the first and second temperature codes TQ_CODE1 and TQ_CODE2. Therefore, the temperature sensors according to the embodiments of the present invention can measure the temperature more precisely.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A temperature sensor comprising:
a reference voltage generation unit configured to divide a driving voltage and generate first and second reference voltages;
a variable voltage generation unit, operatively coupled to the reference voltage generation unit, configured to generate a variable voltage in response to the first reference voltage and a bias resistor;
a first temperature code generation unit, operatively coupled to the reference voltage generation unit and the variable voltage generation unit, configured to compare the first reference voltage with the variable voltage, and generate a first temperature code; and
a second temperature code generation unit, operatively coupled to the reference voltage generation unit and the variable voltage generation unit, configured to compare the second reference voltage with the variable voltage, and generate a second temperature code.

2. The temperature sensor of claim 1, wherein the variable voltage generation unit comprises:
a first resistor coupled between a driving voltage terminal and a first node through which a nonlinear voltage is outputted;
a first switch coupled between the first node and a ground voltage terminal, and configured to be turned on in response to the first reference voltage;
a second resistor coupled between the driving voltage terminal and a second node through which the variable voltage is outputted;
a second switch coupled between the second node and a third node, and configured to be turned on in response to the nonlinear voltage; and
a third resistor coupled between the third node and the ground voltage terminal.

3. The temperature sensor of claim 2, wherein the nonlinear voltage increases nonlinearly, depending on a temperature variation.

4. The temperature sensor of claim 3, wherein the variable voltage decreases linearly, depending on the temperature variation.

5. The temperature sensor of claim 4, wherein the first switch comprises an NMOS transistor configured so that a smaller amount of turn-on current flows as temperature increases, and the second switch comprises an NMOS transistor configured so that a larger amount of turn-on current flows as temperature increases.

6. The temperature sensor of claim 1, wherein the variable voltage generation unit comprises:
a decoding signal generator configured to selectively output a fuse signal or a test mode signal as a decoding signal in response to a test enable signal, the fuse signal being in response to a fuse cutting;
a bias resistor controller, operatively coupled to the decoding signal generator, configured to control a bias resistance between a driving voltage terminal and an output node, through which a nonlinear voltage is outputted, in response to the decoding signal; and
a first switch coupled between the output node and a ground voltage terminal, and configured to be turned on in response to the first reference voltage.

7. The temperature sensor of claim 6, wherein the decoding signal generator comprises:
a fuse signal generation circuit configured to generate first and second fuse signals in response to first or second fuses being cut, respectively; and
a selective output circuit, operatively coupled to the fuse signal generation circuit, configured to selectively output the first fuse signal or a first test mode signal as a first decoding signal in response to the test enable signal, and selectively output the second fuse signal or a second test mode signal as a second decoding signal in response to the test enable signal.

8. The temperature sensor of claim 7 wherein the fuse signal generation circuit comprises:
a pull-up element coupled between a power supply voltage terminal and a first node, and configured to pull up the first node in response to a power-up signal;
a first fuse coupled between the first node and a second node; and
a second fuse coupled between the first node and a third node.

9. The temperature sensor of claim 7, wherein the selective output circuit comprises:
a first transfer gate, operatively coupled to the fuse signal generation circuit, configured to transfer the first fuse signal as the first decoding signal in response to the test enable signal;
a second transfer gate configured to transfer the first test mode signal as the first decoding signal in response to the test enable signal;
a third transfer gate, operatively coupled to the fuse signal generation circuit, configured to transfer the second fuse signal as the second decoding signal in response to the test enable signal; and
a fourth transfer gate configured to transfer the second test mode signal as the second decoding signal in response to the test enable signal.

10. The temperature sensor of claim 6, wherein the bias resistor controller comprises first and second resistors coupled in series between the driving voltage terminal and the output node, and both terminals of at least one of the first and second resistors are shorted together in response to the decoding signal.

11. The temperature sensor of claim 6, wherein the variable voltage generation unit further comprises:
   a first resistor coupled between the driving voltage terminal and a first node through which the variable voltage is outputted;
   a second switch coupled between the first node and a second node, and configured to be turned on in response to the nonlinear voltage; and
   a second resistor coupled between the second node and a ground voltage.

12. The temperature sensor of claim 1, wherein the first temperature code generation unit is further configured to generate the first temperature code when the variable voltage is lower than the first reference voltage, and the second temperature code generation unit is further configured to generate the second temperature code when the variable voltage is lower than the second reference voltage.

13. A temperature sensor comprising:
   a variable voltage generation unit, configured to generate a variable voltage in response to a first reference voltage;
   a first temperature code generation unit, operatively coupled to the variable voltage generation unit, configured to compare the first reference voltage with the variable voltage, and generate a first temperature code; and
   a second temperature code generation unit, operatively coupled to the variable voltage generation unit, configured to compare a second reference voltage with the variable voltage, and generate a second temperature code.

* * * * *